United States Patent

[11] 3,613,790

| [72] | Inventors | Caleb M. Stout<br>Tulsa;<br>Charles F. Smith, Tulsa; Thomas J. Nolan, III, Langston, all of Okla. |
|---|---|---|
| [21] | Appl. No. | 860,730 |
| [22] | Filed | Sept. 24, 1969 |
| [45] | Patented | Oct. 19, 1971 |
| [73] | Assignee | The Dow Chemical Company<br>Midland, Mich. |

[54] METHOD OF PLUGGING A FORMATION
11 Claims, 1 Drawing Fig.

[52] U.S. Cl. ............................................. 166/294, 166/295
[51] Int. Cl. ............................................. E21b 33/138
[50] Field of Search ............................................. 166/294, 285, 295, 282, 283, 281, 292; 252/8.5 C, 8.55

[56] References Cited
UNITED STATES PATENTS

| 3,032,498 | 5/1962 | Walker | 252/8.5 |
|---|---|---|---|
| 3,079,332 | 2/1963 | Wyant | 252/8.5 X |
| 3,243,000 | 3/1966 | Patton et al. | 252/8.5 X |
| 3,251,768 | 5/1966 | Walker | 252/8.5 |
| 3,372,112 | 3/1968 | Parker | 252/8.5 |

Primary Examiner—Stephen J. Novosad
Attorneys—Griswold and Burdick, Bruce M. Kanuch and William R. Norris ABSTRACT: A novel composition and method is provided for temporarily plugging wellbores for extended periods of time, e.g., up to 10 years and more. The composition comprises a thickened aqueous based mixture containing water-swellable clay and inorganic, acid soluble particles, such as minerals, e.g., $CaCO_3$, as solid constituents. The method comprises introducing said novel composition into a well to be plugged followed by a sufficient amount of an aqueous medium to provide a hydrostatic head over and in contact with said composition which exerts a pressure on said mixture which is greater than the formation pressure at the point of application. The plugging composition can be removed from the well when desired by contacting it with acidic solutions.

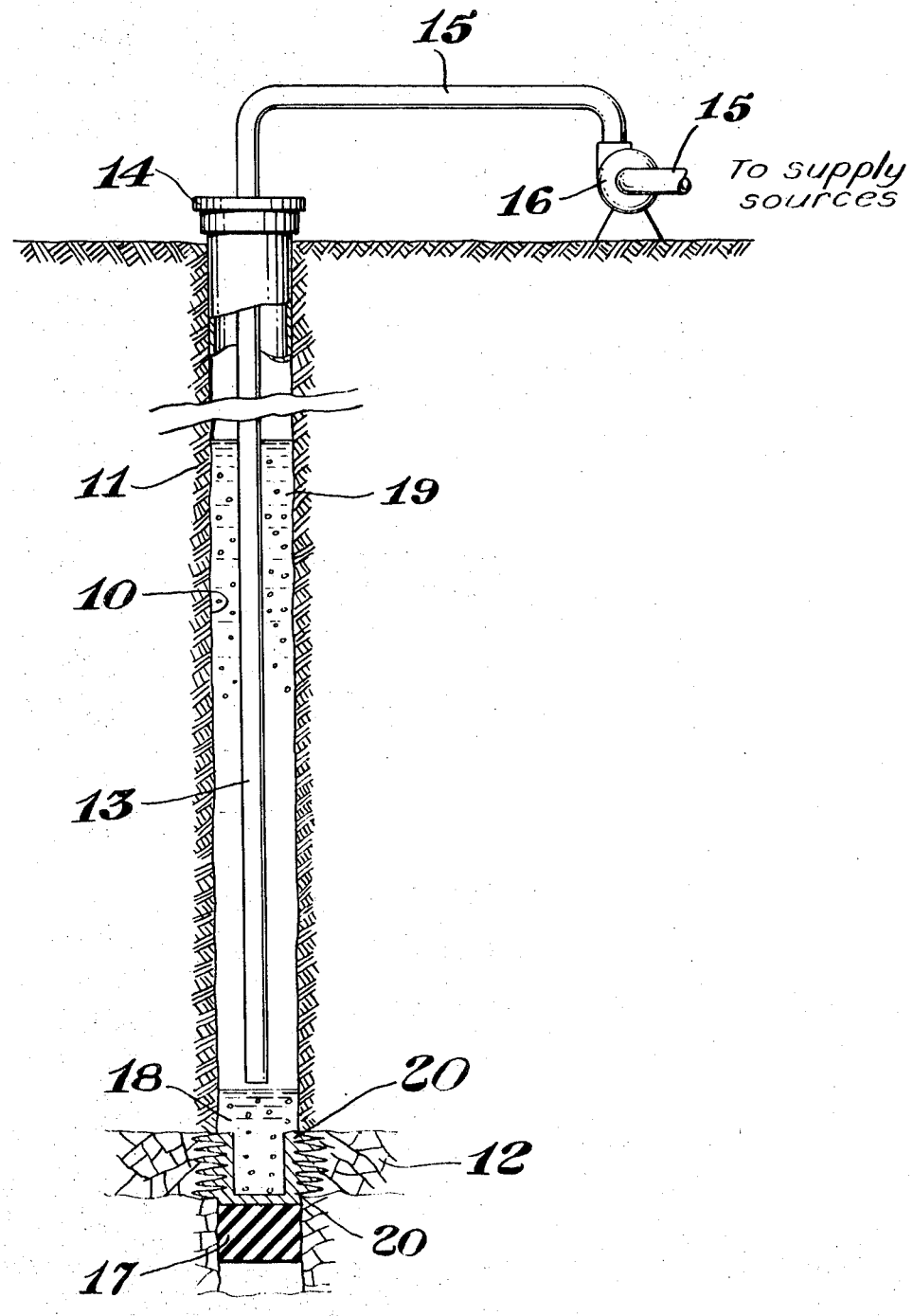

METHOD OF PLUGGING A FORMATION

BACKGROUND OF THE INVENTION

It is sometimes desirable to temporarily abandon producing gas and oil wells. In these situations it is desirous to temporarily plug or "moth-ball" production zones in these wells with the tubing in place so that the wells can be returned to production in the future.

In the past these wells have been temporarily plugged by employing cement compositions. The cement plugs have to be drilled out when it is desired to return the well to production.

In many areas where such wells are located it is very uneconomical to move in rigs for cementing and drilling purposes once they have been removed from the area. It would be desirable if a plugging composition were developed which could be easily implaced and removed without the need for drilling rigs and the like. The present invention concerns a novel composition and a method for plugging wells with this composition.

SUMMARY OF THE INVENTION

The plugging composition of the present invention comprises a mixture containing the following constituents as percent by weight: water insoluble particulate material which is soluble in acidic solutions, e.g., minerals such as, calcium carbonate about 15 to about 85 percent, water swellable clay about 2 to about 50 percent, thickening agent about 0.1 to about 35 percent; and optionally a basic material to adjust the pH of the solution to allow hydration of the thickeners about 1 to about 10 percent, a crosslinking agent for said thickeners about 1 to about 10 percent, and bactericide about 0.001 to about 0.01 percent; a carrier liquid is provided in an amount such that the above mixture ranges from about 0.5 to about 65 pounds per barrel of the carrier liquid.

The composition is introduced into a well next to the producing formation desired to be plugged, followed by an aqueous medium to provide a hydrostatic head above the plugging mixture. The hydrostatic head preferably is provided in an amount sufficient to exert a pressure on the plug which is greater than the formation pressure. Because of the differential pressure the solids in the unique composition will form a filter cake or otherwise bridge the permeable formation desired to be plugged. As fluid loss is reduced by the filter cake the static condition allows solids to settle around the tubing. The plug is stable for many years. When it is desired to return the well to production the plug can be removed by contacting it with an acidic solution such as 15 percent HCl.

BRIEF DESCRIPTION OF THE DRAWINGS

The FIGURE shows a well with tubing in place and with the novel composition of the present invention forming a plug at the lower end of the tubing.

DETAILED DESCRIPTION OF THE INVENTION

As indicated, the present invention concerns a novel plugging composition and a method for temporarily plugging wells. The novel composition comprises the following mixture as percent by weight.

| | Percent Range | Preferred Range |
|---|---|---|
| Fine Mineral Particles | 15–85% | 40–50% |
| Water Swellable Clay Particles | 2–50% | 15–20% |
| Thickening Agent | 0.1–35% | 15–30% |
| Basic Compound (optional) | 1–10% | 5–10% |
| Cross-linking Agent (optional) | 1–10% | 5–10% |
| Bactericide (optional | <1.0% | 0.001–0.01% |

The present mixture is provided in a carrier liquid in an amount ranging from about 0.5 to 65 pounds of said mixture per barrel of carrier liquid. Preferably the mixture is provided in amounts ranging from about 25 to about 60 pounds per barrel of carrier liquid; and more preferably about 50 pounds of the mixture per barrel of carrier liquid is employed. The carrier liquid preferably consists of a heavy brine, e.g., sodium chloride and the like. A preferred carrier liquid comprises an aqueous solution containing about 9.8 pounds per gallon of sodium chloride. Fluid salt concentration together with plugging additive must give weight sufficient to over balance the formation pressure.

Particulate clays which may be employed comprise those clays which are swellable, but substantially insoluble in aqueous solutions and which are soluble in acidic solutions. Suitable clays include, for example, kaolin, ball clay, fire clay, stoneware clay, bentonite, fullers earth, and other like clays.

As indicated one of the solid constituents comprise particulate materials which are insoluble in water and brine but which are soluble in acidic solutions. Suitable materials include several minerals such as alabandite, anhydrite, ankerite, arayonite, azurite, beckelite, gaylussite, glauberite, goethite, gypsum, hematite, periclase, and the like.

The thickening agent is employed to suspend the particulate materials in the carrier liquid while it is being pumped to the formation.

Preferably at least two types of thickening agents are employed in the present composition. One thickening agent quickly swells to build sufficient viscosity for holding the solid ingredients in suspension for at least a sufficient length of time to place the plugging mixture into position. Cellulosic thickening compositions are suitable for this type of thickener. They include for example, carboxy methyl hydroxy ethyl cellulose, hydroxy ethyl cellulose and other degradable cellulosic derivatives. The second thickener is stable at elevated borehole temperatures, e.g., 150° F. to about 250° F. to maintain the higher viscosity of the plugging mixture for a sufficient period of time after emplacement to prevent blowouts, but which eventually breaks down allowing the solids in the mixture to settle forming the plug. The thickeners should provide an initial viscosity which is sufficient to prevent blowouts, i.e., formation pressures blowing the mixture out or the hydrostatic head forcing the mixture too far into the formation. The thickener also adds some cohesion to the final solid plug.

Examples of thickening and gelling agents which can be employed include tree exudatas such as gum arabic, ghatti, karaya and tragacanth; seaweed colloids such as agar, Irish moss, carrageenin, and the alginates, exocellular heteropolysaccharides made by fermenting starch-derived sugars; seed extracts such as locust bean, locust kernel, guar and quince seed gums; starches and modified starches such as dextrins, hydroxyethyl starch and British gums. In addition to the foregoing water-soluble natural and derivative polysaccharides, gelatin, casein; polyvinyl alcohol; polyacrylamides of high-molecular weight and modified polyacrylamides, e.g., partially hydrolyzed polyacrylamides, copolymers of acrylamide and acrylic acid, polyacrylic acid, polyvinylpyrrolidone; high-molecular weight polyethylene oxides as well as mixtures of the aforementioned thickening and gelling agents can be used. Polyacrylamides employed herein can have a molecular weight ranging from 1 to about 25 million. Of course, such agents should be selected so that they are compatible with the system.

Calcium hydroxide and/or other suitable basic compounds, e.g., alkali metal hydroxides and the like, can be employed to adjust the pH of the carrier solution within a range, preferably neutral to basic, preferably from about 8.6 to about 13.5, so that the thickening agents can hydrate to increase the viscosity of the mixture. Suitable crosslinking agents such as, for example, water soluble compounds containing polyvalent metal ions, e.g., $KCr(SO_4)_2 \cdot 12H_2O$ chromates, borates, ferric ions and the like, can also be employed to cross-link the thickener and provide stronger gels. Also, various bactericides can be employed to hinder the growth of bacteria which might degrade the plug. Suitable bactericides known in the oil and gas industries can be employed. They include, for example, various chlorophenol compounds, e.g., pentachlorophenol, quaternary ammonium chloride and the like.

To illustrate one embodiment of the method of the present invention reference is made to the FIGURE. A well 10 penetrating an earth formation 11 is shown. The well penetrates a production zone 12 which is producing oil, gas or the like. A tubing string 13 is in place providing fluid communication between the production zone 12 and the surface through a table 14. Suitable surface tubing 15 connects the tubing string 13 with a pumping means 16 which in turn communicates through additional tubing with a source of supply of aqueous media and plugging mixture (not shown). A packer 17 has been positioned below the production zone as shown. A sufficient quantity of a plugging composition as defined herein is pumped through the tubing string 13 and into position 18 in the production zone 12. The plugging composition is immediately followed by an aqueous medium to provide a hydrostatic head 19 above and in contact with the plugging composition.

As previously indicated the hydrostatic head should exert a pressure on said plug which is greater than the formation pressure. Preferably the hydrostatic head should exert a pressure which is at least about 100 p.s.i. greater than the formation pressure. Preferably a differential pressure of about 1,500 p.s.i. is employed.

Because of the pressure differential between the hydrostatic head and the formation pressure the solid constituents in the plugging composition will filter out of the composition 18 and form a filter cake 20 which is held in place by this same pressure differential. When it is desired to return the well to production the aqueous medium forming the hydrostatic head 19 is removed from the well and the filter cake 20 removed with an acid soak and wash. Acidic solutions which can be employed include those which effectively dissolve the plug without undue harm to the formation tubing and other equipment. They include, for example, HCl, HCl/HF mixtures and the like.

EXAMPLE 1

In the present example the effect of borehole temperatures on plugging compositions was determined by placing various sample compositions in an oil bath maintained at about 190° F. for a period of 5 days. At the end of this period the samples were visually checked for viscosity changes as shown by solids suspension. The compositions and results of the tests are shown in the following Table I. In all the samples, 5 pounds of the indicated mixture was suspended in 100 gallons of a NaCl brine with density of 9.8 pounds per gallon.

EXAMPLE 2

Fluid loss test were conducted with certain of the sample compositions prepared in example 1. Fluid loss tests were run in accordance with API RP 13 B, procedure for drilling fluids. The tests were run at 1,500 p.s.i. and about 200° F. on Bariod filter paper (3 sheets) and on 1 inch diameter by 1 inch long berea sandstone cores. The tests employing the sandstone cores exemplify the fluid loss to a sandstone formation such as would be found in an oil producing formation. The total loss of fluid (in milliliters) through the filter paper and sandstone was determined after 1, 5, 15, 30 and 60 minutes. The sample composition (the same as the composition sample nos. of example 1 ) and fluid loss are set forth in the following table II.

TABLE II

| | Sample composition | Fluid loss (ml.) at— | | | | |
|---|---|---|---|---|---|---|
| | | 1 min. | 5 min. | 15 min. | 30 min. | 60 min. |
| Run No.: | A. Filter paper | | | | | |
| 1 | Composition sample No. 5, Table I | 1.2 | 3.0 | 6.1 | 10.0 | |
| 2 | Composition sample No. 6, Table I | 3.8 | 15.2 | | | |
| 3 | Composition sample No. 7, Table I | 4.4 | 8.0 | 13.5 | 21.0 | |
| 4 | Composition sample No. 8, Table I | 5.0 | 9.5 | 16.5 | | |
| 5 | Composition sample No. 9, Table I | 5.0 | 9.0 | 16.5 | 23.0 | |
| | B. Berea sandstone | | | | | |
| 6 | Composition sample No. 7, Table I | 1.5 | 2.6 | 4.1 | 6.5 | |
| 7 | Composition sample No. 7, Table I | 0.7 | 1.7 | 2.7 | 3.9 | 5.8 |
| 8 | Composition sample No. 9, Table I | 0.5 | 1.3 | 2.5 | 4.5 | 7.7 |

As evidenced by these tests, compositions within the scope of the present invention completely prevented fluid penetration through the filter paper after 60 minutes. The composition of example No. 6, table I, prevented fluid loss within 5 minutes. The average fluid loss after 60 minutes in the sandstone core was only about 6 ml. Over an extended period of time (e.g., 3–4 years) the rate of loss would not detrimentally effect the hydrostatic head above the plugging composition in a borehole.

What is claimed is:

1. A method for plugging a permeable formation located adjacent to a borehole penetrating said formation which comprises
   a. introducing into said formation through said borehole a plugging composition comprising (1) a mixture comprising, as per cent by weight of said mixture, (a) water swellable clay particles from about 2 to about 50 per cent, (b) water insoluble, acid soluble mineral particles about 15 to about 85 percent and (c) a water dispersible organic polymeric thickening agent about 0.1 to about 35 percent and (2) an aqueous carrier liquid for said mixture in an amount such that said mixture comprises from about 0.5 to about 65 pounds per barrel of said aqueous carrier liquid; and
   b. providing a hydrostatic head comprising a heavy brine in said borehole in contact with said plugging composition in an amount sufficient to exert a pressure on said composition which is greater than the formation pressure at the depth of said permeable formation for the time that said formation is to be plugged.

2. The method as defined in claim 1 wherein said permeable formation is a producing formation.

3. The method as defined in claim 1 wherein said thickening agent comprises two materials comprising a quickly hydrating-type thickening agent and a thickening agent stable at elevated temperatures of about 150° F. to about 250° F.

TABLE I

| Sample Number | Percent composition of dry mixtures | | | | | | | | |
|---|---|---|---|---|---|---|---|---|---|
| | 1 | 2 | 3 | 4 | 5 | 6 | 7 | 8 | 9 |
| CaCO₃ | 60 | 50 | 50 | 40 | 40 | 45 | 45 | 45 | 50 |
| Bentonite | | | 25 | 25 | 10 | 20 | 20 | 20 | 25 |
| Polysaccharide | 30 | 25 | 25 | 25 | 25 | 20 | 25 | 17.5 | |
| Hydroxy ethyl cellulose | | 15 | | 10 | 15 | 5 | 10 | 7.5 | 15 |
| KCr (SO₄)₂·12H₂O | 5 | 5 | | | 5 | 5 | 5 | 5 | 5 |
| Ca (OH)₂ | 5 | 5 | | | 5 | 5 | 5 | 5 | 5 |
| Sodium pentachlorophenate | | | (¹) | (¹) | 0.025 | 0.025 | 0.025 | 0.025 | 0.025 |
| Temperature—effect | None | None | (¹) | (¹) | (¹) | None | None | None | None |

¹ Did not gel.

4. The method as defined in claim 3 wherein said mixture comprises:
   a. water swellable clay particles from about 15 to about 20 percent;
   b. water insoluble, acid soluble particulate mineral from about 40 to about 50 percent;
   c. thickening agent from about 15 to about 30 percent; and
   d. an effective amount of a crosslinking agent for said thickening agent; and
   e. an aqueous carrier liquid for said mixture in an amount such that said mixture ranges from about 0.5 to about 65 pounds per barrel of said aqueous carrier liquid.

5. The method as defined in claim 4 wherein said carrier liquid is a brine.

6. The method as defined in claim 5 including in said mixture an effective amount of a bactericide.

7. The method as defined in claim 4 wherein said aqueous carrier liquid is provided in an amount such that said mixture ranges from about 25 to about 60 pounds per barrel of said aqueous carrier liquid.

8. The method as defined in claim 7 wherein said aqueous carrier liquid is a brine.

9. The method as defined in claim 7 including in addition in said mixture a sufficient amount of a basic material to provide a pH ranging from about 8.6 to 13.5 in said carrier liquid.

10. The method as defined in claim 1 wherein said pressure exerted by said hydrostatic head is at least 100 p.s.i. greater than said formation pressure.

11. The method as defined in claim 1 wherein said pressure exerted by said hydrostatic head is about 1,500 p.s.i. greater than said formation pressure.